US010920118B2

(12) United States Patent
Zhu et al.

(10) Patent No.: US 10,920,118 B2
(45) Date of Patent: Feb. 16, 2021

(54) LONG OPEN-TIME WATER BASED PRIMER COMPOSITION FOR ISOCYANATE AND SILANE FUNCTIONAL ADHESIVES

(71) Applicants: DOW GLOBAL TECHNOLOGIES LLC, Midland, MI (US); ROHM AND HAAS COMPANY, Philadelphia, PA (US)

(72) Inventors: Huide D. Zhu, Auburn Hills, MI (US); Roger A. Cassell, West Alexandria, OH (US); Matthew B. Feldpausch, Auburn Hills, MI (US); George D. Sanchez, Auburn Hills, MI (US); Andrew R. Kneisel, Auburn Hills, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 51 days.

(21) Appl. No.: 16/094,698

(22) PCT Filed: Apr. 13, 2017

(86) PCT No.: PCT/US2017/027323
§ 371 (c)(1),
(2) Date: Oct. 18, 2018

(87) PCT Pub. No.: WO2017/184416
PCT Pub. Date: Oct. 26, 2017

(65) Prior Publication Data
US 2019/0119539 A1 Apr. 25, 2019

Related U.S. Application Data

(60) Provisional application No. 62/324,499, filed on Apr. 19, 2016.

(51) Int. Cl.
| | | |
|---|---|---|
| *C09J 183/08* | (2006.01) | |
| *C09D 183/08* | (2006.01) | |
| *C09J 11/06* | (2006.01) | |
| *C09J 175/04* | (2006.01) | |
| *C08G 77/20* | (2006.01) | |
| *C08G 77/26* | (2006.01) | |
| *C08G 77/28* | (2006.01) | |
| *C08K 5/05* | (2006.01) | |

(52) U.S. Cl.
CPC .............. *C09J 183/08* (2013.01); *C09J 11/06* (2013.01); *C09J 175/04* (2013.01); *C08G 77/20* (2013.01); *C08G 77/26* (2013.01); *C08G 77/28* (2013.01); *C08K 5/05* (2013.01); *C09J 2400/123* (2013.01); *C09J 2400/143* (2013.01); *C09J 2400/20* (2013.01)

(58) Field of Classification Search
CPC ....... C09D 183/08; C09D 5/002; C09J 183/08
See application file for complete search history.

(56) References Cited

U.S. PATENT DOCUMENTS

| | | | |
|---|---|---|---|
| 3,971,751 A | 7/1976 | Isayama et al. | |
| 4,345,053 A | 8/1982 | Rizk et al. | |
| 4,374,237 A | 2/1983 | Berger et al. | |
| 4,562,237 A * | 12/1985 | Okuno | C08G 18/10 |
| | | | 524/775 |
| 4,622,369 A | 11/1986 | Chang et al. | |
| 4,625,012 A | 11/1986 | Rizk et al. | |
| 4,645,816 A | 2/1987 | Pohl et al. | |
| 4,687,533 A | 8/1987 | Rizk et al. | |
| 4,780,520 A | 10/1988 | Rizk et al. | |
| 4,788,254 A | 11/1988 | Kawakubo et al. | |
| 4,906,707 A | 3/1990 | Yukimoto et al. | |
| 4,923,927 A | 5/1990 | Hirose et al. | |
| 5,011,900 A | 4/1991 | Yukimoto et al. | |
| 5,063,269 A | 11/1991 | Hung | |
| 5,063,270 A | 11/1991 | Yukimoto et al. | |
| 5,223,597 A | 6/1993 | Iwakiri et al. | |
| 5,409,995 A | 4/1995 | Iwahara et al. | |
| 5,567,833 A | 10/1996 | Iwahara et al. | |
| 5,603,798 A | 2/1997 | Bhat | |
| 5,623,044 A | 4/1997 | Chiao | |
| 5,650,467 A | 7/1997 | Suzuki et al. | |
| 5,852,137 A | 12/1998 | Hsieh et al. | |
| 5,902,645 A * | 5/1999 | Vorse | C09D 4/00 |
| | | | 427/387 |
| 5,907,015 A | 5/1999 | Sexsmith | |
| 5,976,305 A | 11/1999 | Bhat et al. | |
| 6,512,033 B1 | 1/2003 | Wu | |
| 8,187,716 B2 | 5/2012 | Sutter et al. | |

(Continued)

FOREIGN PATENT DOCUMENTS

| | | |
|---|---|---|
| EP | 2 562 225 A1 | 2/2013 |
| WO | 2011/046773 A1 | 4/2011 |

(Continued)

OTHER PUBLICATIONS

International Search Report and Written Opinion, Application No. PCT/US2017/027323 dated Jun. 29, 2017.

(Continued)

*Primary Examiner* — Margaret G Moore
(74) *Attorney, Agent, or Firm* — Hong Xu

(57) ABSTRACT

Disclosed is a composition comprising: a) an condensate of one or more aminohydrocarbyl alkoxy silanes and one or more alkenyl alkoxy silanes; b) one or more mercaptohydrocarbyl alkoxy silanes; and c) water; wherein the composition is useful as a primer useful with adhesives or coatings containing polymers having isocyanate functional groups, alkoxysilane functional groups or both. The composition may include one or more epoxyhydrocarbyl silanes. The composition may include one or more alkanols in sufficient amount to improve the volatilization of the liquid components away from substrate surface.

16 Claims, No Drawings

(56) References Cited

U.S. PATENT DOCUMENTS

| | | | |
|---|---|---|---|
| 8,263,185 B2* | 9/2012 | Huck | C08G 77/26 427/387 |
| 8,673,999 B2 | 3/2014 | Schmatloch | |
| 2002/0100550 A1 | 8/2002 | Mahdi et al. | |
| 2007/0187028 A1 | 8/2007 | Braun et al. | |
| 2009/0108231 A1 | 4/2009 | Gumvang | |

FOREIGN PATENT DOCUMENTS

| | | |
|---|---|---|
| WO | 2011/112440 A1 | 9/2011 |
| WO | 2015/003045 A1 | 1/2015 |

OTHER PUBLICATIONS

International Preliminary Report on Patentability, Application No. PCT/US2017/027323 dated Jun. 20, 2018.

* cited by examiner

LONG OPEN-TIME WATER BASED PRIMER COMPOSITION FOR ISOCYANATE AND SILANE FUNCTIONAL ADHESIVES

FIELD

Disclosed is a composition useful as an adhesion promoter for bonding adhesives containing prepolymers having isocyanate, silane or both functional groups to substrates which exhibits an open time of about 90 days or greater. Also disclosed are processes for applying the composition disclosed to substrates, including processes wherein the composition is used to improve the adhesion of an adhesive containing prepolymer having isocyanate, silane or both functional groups to a substrate.

BACKGROUND

In many industrial adhesive bonding operations an adhesion promoter is applied to a surface to improve bonding of the adhesive to the surface of the substrate. Typical adhesion promoters are delivered dissolved, or dispersed, in an organic solvent. Organic solvents are used because many have low vapor pressures and volatilize away rapidly after application to the substrate. The solvent needs to be removed before application of the adhesive to facilitate bonding of the adhesive to the substrate. Organic solvents are also chosen because the adhesion promoting components typically can be dissolved or dispersed in an organic solvent. The use of organic solvents can result in their release into the environment. The use of organic solvents may require expensive ventilation and capturing equipment to reduce the risk of unacceptable human exposure or contamination of the environment.

For the abovementioned reasons there is considerable pressure to replace organic solvents in adhesion promoting systems with water. Adhesion promoters dissolved in or dispersed in water are known; see Gimvang United States Patent Publication 2009/0108231 and Braun et al. United States Patent Publication 2007/0187028. The use of water presents its own set of problems, including problems with solubility of the ingredients of the adhesion promoter in water and water's relatively high vapor pressure which can result in slow evaporation of water off of a substrate surface. This slow evaporation can slow down industrial processes. It is desirable to run the processes as fast as possible. Some of the known processes require special dispensers, complex formulations or special process conditions. Water based adhesion promoters can demonstrate poor wetting properties on certain surfaces. Schmatloch U.S. Pat. No. 8,673,999 provides an excellent water based primer system. Despite the success of this primer system certain customers desire a water based primer system that can be applied to a substrate and form a durable bond when an adhesive is applied 90 days or greater after the application of the primer.

What is needed is a composition which is not complex, avoids the use of organic solvents, can be applied using standard application processes and equipment, accommodate standard industrial processing speeds, wets surfaces well, is environmentally friendly and exhibits a 90 day open time, that is forms a durable bond with an adhesive when the adhesive is applied 90 days or greater after application of the primer to a substrate. What is further needed are processes for using such compositions to promote adhesion of adhesives to surfaces.

SUMMARY

Disclosed is a composition comprising: a) a condensate of one or more aminohydrocarbyl alkoxy silanes and one or more alkenyl alkoxy silanes; b) one or more mercaptohydrocarbyl alkoxy silanes; and c) water; wherein the composition is useful with adhesives or coatings containing polymers having isocyanate functional groups, alkoxysilane functional groups or both. The composition can be prepared as a concentrate, shipped and diluted for use. When shipped and diluted before use the composition may comprise: a) from about 10 to about 50 percent by weight of a condensate of one or more aminohydrocarbyl alkoxy silanes and one or more alkenyl alkoxy silanes; b) from about 0.1 to about 10 percent by weight one or more mercaptohydrocarbyl alkoxy silanes; and c) from about 40 to about 89.9 percent by weight of water; wherein the percent by weight is based on the weight of the composition. The composition may be shipped in useable form with the amount of water being sufficient for direct use. The composition when applied may contain a) from about 1.5 to about 10 percent by weight of an condensate of one or more aminohydrocarbyl alkoxy silanes and one or more alkenyl alkoxy silanes; b) from about 0.1 to about 10 percent by weight one or more mercaptohydrocarbyl alkoxy silanes; and c) from about 20 or 40 to about 89.9 percent by weight of water; wherein the percent by weight is based on the weight of the composition. The composition may include d) one more epoxyhydrocarbyl silanes. The d) one more epoxyhydrocarbyl silanes may be present in an amount of about 1.5 to about 10 percent by weight of the composition adapted for application. The condensate may be prepared from about 30 to 70 mole percent of the aminohydrocarbyl alkoxy silanes and from about 30 to 70 mole percent of the alkenyl alkoxy silanes. The composition may include one or more alkanols in sufficient amount to improve the volatilization of the liquid components away from substrate surface.

Disclosed is a kit comprising a composition as disclosed herein and an adhesive or coating comprising a prepolymer containing isocyanate functional groups, alkoxysilane functional groups or a mixture thereof.

Disclosed is a process comprising: a) applying a composition as disclosed herein, and b) wiping the applied composition off of the surface of the substrate, or allowing a major portion of the water in the composition to evaporate off of the surface of the substrate. The process may further comprise contacting the substrate, the first substrate, with an adhesive containing a prepolymer having isocyanate, silane or both functional groups and a second substrate wherein the adhesive is applied to the portion of the surface of the first substrate to which the composition was applied and the adhesive is disposed between the first and the second substrates. The process may include allowing the adhesive or coating to cure.

The composition disclosed promotes adhesion of substrate surfaces to adhesives or coatings containing a prepolymer having isocyanate, silane or both functional groups. The compositions disclosed results in bonds that are comparable to bonds formed when commercial adhesion promoters dissolved in organic solvents are used. The compositions exhibit excellent wetting characteristics on substrates and good water evaporation rates. The compositions exhibit open time of 90 days or greater. The compositions facilitate a bond that exhibits a lap shear strength when an adhesive is applied to a glass substrate 10 minutes after application of the composition disclosed to the substrate and curing at 23° C. for 7 days in 50 percent relative humidity of about 650 psi (4.58 MPa) or greater.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. The specific embodiments of the present invention as set forth are not intended as being exhaustive or limiting of the invention. The scope of the disclosure should be determined with reference to the appended claims, along with the full scope of equivalents to which such claims are entitled. Other combinations are also possible as will be gleaned from the following claims, which are also hereby incorporated by reference into this written description.

The composition disclosed is directed to a unique solution for promoting adhesion of substrates to adhesives or coatings containing a prepolymer having isocyanate, silane or both functional groups. The solution comprises a composition comprising: a) a condensate of one or more aminohydrocarbyl alkoxy silanes and one or more alkenyl alkoxy silanes; b) one or more mercaptohydrocarbyl alkoxy silanes; and c) water: wherein the composition is useful as a primer useful with adhesives or coatings containing polymers having isocyanate functional groups, alkoxysilane functional groups or both. One or more as used herein means that at least one, or more than one, of the recited components may be used as disclosed. Nominal as used with respect to functionality means the theoretical functionality, generally this can be calculated from the stoichiometry of the ingredients used. The actual functionality may be different due to imperfections in raw materials, incomplete conversion of the reactants and formation of by-products. Durability in this context means that the composition once cured remains sufficiently strong to perform its designed function, wherein the cured composition is a primer, coating or an adhesive. The primer facilitates an adhesive bonding to a substrate together for the life or most of the life of the structure and the adhesive holds substrates together for the life or most of the life of the structure containing the cured composition. The primer facilitates a coating bonding to a substrate for the life or most of the life of the structure. As an indicator of this durability, the primer and the curable composition (e.g. adhesive) preferably exhibits excellent results during accelerated aging. Preferably this means that after a set of substrates bonded with the primer and adhesive is exposed to heat aging, the failure mode in Quick Knife adhesion or Lap Shear testing is cohesive, meaning the adhesive breaks before the bond of the adhesive to the substrate breaks. Heteroatom means nitrogen, oxygen, sulfur and phosphorus, more preferred heteroatoms include nitrogen and oxygen. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. As used herein percent by weight or parts by weight refer to, or are based on, the weight or the primer or adhesive compositions unless otherwise specified.

The solvent or dispersant used in the composition is water. The water used may be demineralized and deionized. Water is used in a sufficient amount to form a stable solution or dispersion of the other components. Stable as used herein means that the other components of the composition do not precipitate out of the solution or form a separate phase from the water. The composition may be stable for about 3 months or greater, 12 months or greater, or 3 years or greater. For use as an adhesion promoter the amount of water present is that amount which facilitates application and use of the composition as an adhesion promoter. Water may be present in the composition when ready for use and used in an amount of about 20.0 percent by weight or greater based on the weight of the composition about 40.0 percent by weight or greater based on the weight of the composition, about 60.0 percent by weight or greater or about 64.0 percent by weight or greater. The water may be present in the composition when ready for use and used in an amount of about 89.9 percent by weight or less based on the weight of the composition, more preferably about 85 percent by weight or less and most preferably about 80 percent by weight or less. In order to reduce transportation cost, the composition can be prepared in the form of a concentrate that can be diluted to the concentrations described above for use.

The composition disclosed comprises a condensate of one or more amino-hydrocarbyl alkoxy silanes and one or more alkenyl alkoxy silanes. The condensates are added to the compositions disclosed to improve adhesion between a substrate and an adhesive or coating having isocyanate and/or alkoxy silane functional groups. The condensates further function to improve the stability of the disclosed compositions. Stability means the components remain in solution or dispersion for up to 3 years or more. An amino-hydrocarbyl alkoxy silane is a compound that has one or more alkoxy silyl groups and one or more amines having at least one hydrocarbylene moiety disposed between the alkoxysilyl group and the amine group. The hydrocarbylene group may be alkylene or cycloalkylene, or may be alkylene. The hydrocarbylene group may be a $C_{1-20}$ hydrocarbylene group. Alkylene groups may be $C_{1-20}$ alkylene groups or $C_{1-4}$ alkylene groups. The alkylene groups may be ethylene or propylene. The alkylene groups may be propylene. The amine can be primary or secondary and may have a hydrocarbyl group bonded to the amine nitrogen. Exemplary hydrocarbyl groups on the amine nitrogen may be $C_{1-20}$ hydrocarbyl groups; $C_{1-20}$ alkyl groups, cyclohexyl and phenyl; $C_{1-4}$ alkyl groups; or methyl or ethyl groups. Alkoxysilyl groups are groups having a silicon atom bonded to from one to three alkoxy groups; two or three alkoxy groups; or three alkoxy groups. The alkyl groups on the alkoxy moiety may be $C_{1-4}$ alkyl; ethyl or methyl; or methyl. The alkoxy silyl groups may have 1 or 2 alkyl groups bonded to the silicon atom. The alkyl groups bonded to the silicon atom may be $C_{1-4}$ alkyl; ethyl or methyl; or methyl. The amino-hydrocarbyl alkoxy silanes may comprise two hydrocarbylene alkoxy silanes bonded to a single amino group, for example amino bis (hydrocarbylene alkoxy silanes). The hydrocarbyl or hydrocarbylene groups may contain one or more heteroatoms or heteroatom containing groups which do not interfere in the desired function of the amino-hydrocarbyl alkoxy silanes, for example ether linkages, keto groups, carboxyoxy, amino groups, urethane groups and the like.

The aminohydrocarbyl alkoxy silanes may correspond to one of formulas 1 or 2:

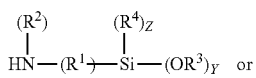

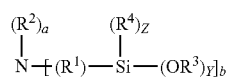

The amino $C_{1-4}$ alkyl alkoxy silane may correspond to formulas 3 or 4:

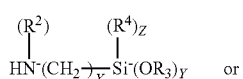

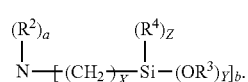

Exemplary classes of $C_{1-4}$ alkyl alkoxy silanes include amino $C_{1-4}$ alkyl di or trimethyoxy ethoxy silanes or aminopropyl di or tri methyoxy or ethoxy silanes.

Exemplary aminohydrocarbyl alkoxy silanes include 3-aminopropyltrimethoxysilane, 3-aminopropyl-dimethoxymethylsilane, 3-amino-2-methylpropyl-trimethoxy silane, 4-aminobutyl-trimethoxysilane, 4-aminobutyldimethoxymethylsilane, 4-amino-3-methylbutyl-trimethoxysilane, 4-amino-3,3-dimethylbutyltrimethoxysilane, 4-amino-3,3-di-methylbutyldimethoxymethylsilane, 2-aminoethyltrimethoxysilane, 2-amino-ethyldimethoxymethylsilane, aminomethyltrimethoxysilane, aminomethyldimethoxymethylsilane, aminomethylmethoxydimethylsilane, N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane, N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethyl-aminomethyldimethoxymethylsilane, N-propylaminomethyldimethoxymethyl-silane, N-butylaminomethyldimethoxymethylsilane and mixtures thereof. Exemplary amino-hydrocarbyl alkoxy silanes include aminopropyl dimethyloxysilane, aminopropyl diethoxy silane, aminopropyl trimethyoxy silane, and aminopropyl triethoxy silane.

The one or more alkenyl alkoxy silanes may be any compounds containing alkoxy silyl groups having bonded to the silicon atom an alkenyl group, a group having two or more carbon atoms and one or more double bonds. The double bond may be internal to the carbon chain or may be located at the terminal carbon atoms; and the double bond may be located at the terminal carbon atoms. The alkenyl alkoxy silanes may have one or more heteroatoms disposed between the alkenyl group and the silicon atom or disposed within the alkenyl group. The heteroatoms may form heteroatom containing functional groups such as an ether linkage, carbonyl group, carbonyloxy group, and the like. The heteroatom containing alkenyl alkoxy silanes include alkenyloxy alkoxy silanes, alkenylketo alkoxy silanes, and alkenyl esters of alkoxy silanes. The alkenyl esters of alkoxy silanes include acrylate esters of alkyl alkoxy silanes. The alkenyl group may be bonded directly to the silicon atom of the alkoxy silyl groups. The one or more alkenyl alkoxy silanes may be a vinyl di or tri methoxy silanes. The alkenyl group on the alkenyl alkoxy silanes may be vinyl, allyl, butenyl, such as 3-butenyl, pentenyl, hexenyl, ethylhexenyl, heptenyl, octenyl, cyclohexenyl-$C_1$ to $C_8$-alkylene, for example cyclohexenyl-2-ethylene, such as 3"-cyclohexenyl-2-ethylene, and/or cyclohexadienyl-C1 to C8-alkylene, such as cyclohexadienyl-2-ethylene, group. The alkenyl group on the alkenyl alkoxy silanes may be vinyl, allyl, butenyl, such as 3-butenyl, 5-hexenyl, 6-heptenyl, 7-octenyl, 8-nonenyl, 9-decenyl, or 10-undecenyl.

The one or more alkenyl alkoxy silanes may correspond to formula 5:

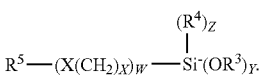

Where the alkenyl group is bonded to the silicon atom of the alkoxy silyl group the one or more alkenyl alkoxy silanes may correspond to formula 6:

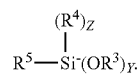

Where the alkenyl alkoxy silanes comprise acrylate esters of alkyl alkoxy silanes such compounds may correspond to formula 7:

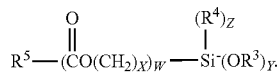

Terminal alkenyl alkoxy silanes, which include acrylate esters of alkyl alkoxy silanes may correspond to formula 8;

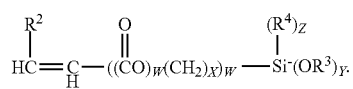

The terminal alkenyl alkoxy silanes may correspond to the 9:

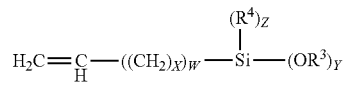

The condensates formed may correspond to one of formulas 10 or 11:

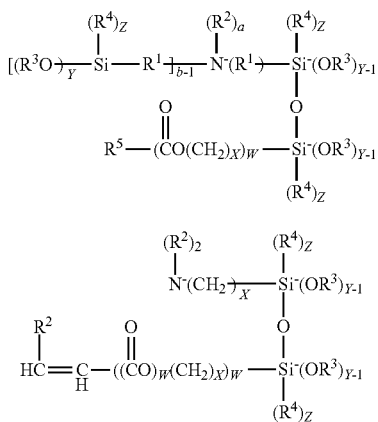

10

11

The condensates formed may correspond to one of formulas 12 or 13:

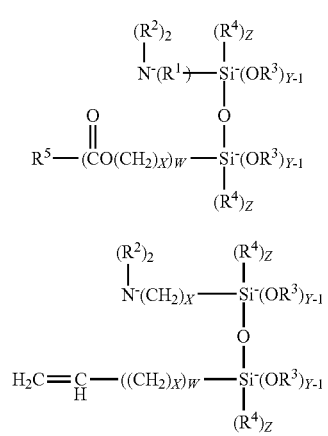

12

13

The condensates of one or more aminohydrocarbyl alkoxy silanes and alkenyl alkoxy silanes may comprise about 30 mole percent of the aminohydrocarbyl alkoxy silanes or greater, about 40 mole percent of the aminohydrocarbyl alkoxy silanes or greater, or about 45 mole percent of the aminohydrocarbyl alkoxy silanes or greater. The condensates of one or more aminohydrocarbyl alkoxy silanes and alkenyl alkoxy silanes may comprise about 70 mole percent of the aminohydrocarbyl alkoxy silanes or less, about 60 mole percent of the aminohydrocarbyl alkoxy silanes or less, or about 55 mole percent of the aminohydrocarbyl alkoxy silanes or less. The condensates of one or more aminohydrocarbyl alkoxy silanes and one or more alkenyl alkoxy silanes may comprise about 30 mole percent of the alkenyl alkoxy silanes or greater, about 40 mole percent of the alkenyl alkoxy silanes or greater, or about 45 mole percent of the alkenyl alkoxy silanes or greater. The condensates of one or more aminohydrocarbyl alkoxy silanes and one or more alkenyl alkoxy silanes may comprise about 70 mole percent of the alkenyl alkoxy silanes or less, about 60 mole percent of the alkenyl alkoxy silanes or less, or about 55 mole percent of the alkenyl alkoxy silanes or less. The mole percentages of the one or more aminohydrocarbyl alkoxy silanes and the one or more alkenyl alkoxy silanes may combine to be 100. The one of the alkoxysilyl groups of the aminohydrocarbyl alkoxy silanes may undergo silanol condensation with an alkoxysilyl group of the alkenyl alkoxy silanes Depending on the mole ratios the condensates may contain some unreacted aminohydrocarbyl alkoxy silanes or alkenyl alkoxy silanes.

The condensates may be prepared by known silanol condensation process. The silanol condensation proceeds upon exposure to atmospheric moisture or water. This is a relatively slow curing mechanism in the absence of a catalyst and/or heat. Silanol condensation may catalyzed by acid, base or organic metallic catalysts, as described hereinafter with respect to the adhesive systems. Silanol condensation catalysts such as tin catalysts are well known in the art, see U.S. 2002/0100550, paragraph [0042], incorporated herein by reference. The starting compound may be exposed to temperatures at which silanol condensation is accelerated. Temperatures at which silanol condensation is accelerated, such as 40° C. or greater, 50° C. or greater or 80° C. or less or 70° C. or less. The amount of catalyst in the reaction mixture may be about 0.01 percent by weight or greater, about 0.1 percent by weight or greater, or about 0.2 percent by weight or greater, and about 5 percent by weight or less, about 1.0 percent by weight or less, about 0.5 percent by weight or about 0.4 percent by weight or less. One or more aminohydrocarbyl alkoxy silanes and alkenyl alkoxy silanes may be contacted in about a one to one molar ratio in 3.5 to 4.0 moles of water. The mixture is heated to about 45 to about 50° C. The reaction is exothermic and the mixtures temperature may rise to about 55° C. The reaction is complete in about 1.5 to 2.5 hours. The condensate may be further diluted with water. After condensation the resulting mixture of the condensate in water has the pH adjusted with an acid, such as by a carboxylic acid, for instance formic acid, and acetic acid, or a mineral acid such as HCl, $H_3PO_4$, and $H_2SO_4$, $HNO_3$ and the like. One or more non-ionic surfactants may be added to the mixture to enhance the solubility of the condensate formed in water. The non-ionic surfactants may be present in an amount of about 0.2 percent by weight or greater or about 1 percent by weight or greater. The non-ionic surfactants may be present in an amount of about 3.0 percent by weight or less or about 2 percent by weight or less. The pH of the resulting mixture can be adjusted to about 4.5 to about 5.5.

The condensates are added to the compositions disclosed in sufficient amount to improve adhesion between a substrate and an adhesive or coating having isocyanate and/or alkoxy silane functional groups and to improve the stability of the disclosed compositions. The condensates may be added in solid form comprising the condensates. The condensates may be added in the form of solutions in water wherein the solutions are the resulting product of the process for preparing the condensates. The condensate content of this mixture may be about 15 percent by weight or greater or 16 percent by weight or greater. The condensate content of this mixture may be about 20 percent by weight or less or 18 percent by weight or less. The mixture of condensates water and other ingredients which is the product of the process for preparing the condensates may be present in an amount of about 10 percent by weight or greater based on the weight of the composition; about 15 percent by weight or greater. The mixture of condensates water and other ingredients which is the product of the process for preparing the condensates may be present in an amount of about 50 percent by weight or less based on the weight of the composition; about 40 percent by weight or less or about 30 percent by weight or less. The condensates may be present in the primer composition in an amount of 1.0 percent by weight or greater, 1.5 percent by weight of greater or 2.0 percent by weight or greater. The condensates may be present in the primer composition in an amount of 10 percent by weight or less, 8 percent by weight of less or 6 percent by weight or less.

The compositions include one or more mercaptohydrocarbyl alkoxy silanes which enhance adhesion of a substrate to a coating or adhesive having isocyanate functional groups alkoxy silane functional groups or both. Any mercaptohydrocarbyl alkoxy silanes that enhances adhesion of a substrate to a coating or adhesive having isocyanate functional groups alkoxy silane functional groups or both may be used in the composition. The mercaptohydrocarbyl alkoxy silanes contain a mercapto group bonded to a hydrocarbylene group which is further bonded to an alkoxy silyl group. The hydrocarbylene group may be alkylene or cycloalkylene, or may be alkylene. The hydrocarbylene group may be a $C_{1-20}$ hydrocarbylene group. Alkylene groups may be $C_{1-20}$ alkylene groups or $C_{1-4}$ alkylene groups. The alkylene groups may be ethylene or propylene. The alkylene groups may be propylene. Alkoxy silyl groups are groups having a silicon atom bonded to from one to three alkoxy groups; two or three alkoxy groups; or three alkoxy groups. The alkyl groups on the alkoxy moiety may be $C_{1-4}$ alkyl; ethyl or methyl; or methyl. The alkoxy silyl groups may have 1 or 2 alkyl groups bonded to the silicon atom. The alkyl groups bonded to the silicon atom may be $C_{1-4}$ alkyl; ethyl or methyl. The alkyl groups bonded to the silicon atom may be methyl. Exemplary mercaptohydrocarbyl alkoxy silanes include mercapto $C_{1-4}$ alkyl di or tri methoxy silanes or mercapto propyl di or tri methoxy silanes. The mercaptohydrocarbyl alkoxy silanes may correspond to formula 14:

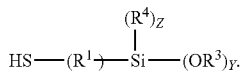

14

The mercapto $C_{1-4}$ alkyl di or tri methoxy silanes may correspond to formula 15:

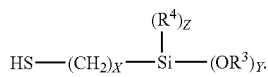

15

The one or more mercaptohydrocarbyl alkoxy silanes are present in sufficient amount to improve the adhesion of a coating or adhesive having isocyanate functional groups, alkoxy silane functional groups or both to a substrate. The mercaptohydrocarbyl alkoxy silanes may be present in the primer composition an amount of about 0.1 percent by weight or greater based on the weight of the composition; about 0.15 percent by weight or greater or about 0.3 percent by weight or greater. The mercaptohydrocarbyl alkoxy silanes may be present in the primer composition in an amount of about 10 percent by weight or less based on the weight of the composition; about 3.0 percent by weight or less or about 2.0 percent by weight or less.

The compositions disclosed may include one or more epoxyhydrocarbyl alkoxy silanes. Any epoxyhydrocarbyl alkoxy silanes that improve the adhesion of a coating or adhesive having isocyanate functional groups, alkoxy silane functional groups or both to a substrate may be used. The epoxyhydrocarbyl alkoxy silanes contain a glycidyloxy group bonded to a hydrocarbylene group which is further bonded to an alkoxy silyl group. The hydrocarbylene group may be alkylene or cycloalkylene, or may be alkylene. The hydrocarbylene group may be a $C_{1-20}$ hydrocarbylene group. Alkylene groups may be $C_{1-20}$ alkylene groups or $C_{1-4}$ alkylene groups. The alkylene groups may be ethylene or propylene. The alkylene groups may be propylene. Alkoxy silyl groups are groups having a silicon atom bonded to from one to three alkoxy groups; two or three alkoxy groups; or three alkoxy groups. The alkyl groups on the alkoxy moiety may be $C_{1-4}$ alkyl; ethyl or methyl; or methyl. The alkoxy silyl groups may have 1 or 2 alkyl groups bonded to the silicon atom. The alkyl groups bonded to the silicon atom may be $C_{1-4}$ alkyl; ethyl or methyl; or methyl. Exemplary epoxyhydrocarbyl alkoxy silanes include glycidyl $C_{1-4}$ alkyl alkoxy silanes, such as glycidyl $C_{1-4}$ alkyl di or tri methoxy silane or glycidyl propyl di or tri methoxy silanes. Exemplary epoxyhydrocarbyl alkoxy silanes include glycidoxypropyl trimethoxysilane, 3-glycidoxypropyl dimethylethoxysilane, and (3-glycidoxypropyl) methyl diethoxysilane. Epoxyhydrocarbyl alkoxy silanes may correspond to formula 16:

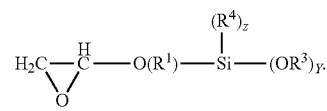

16

The glycidyl $C_{1-4}$ alkyl alkoxy silanes may correspond to formula 17:

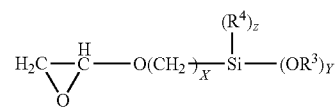

The epoxyhydrocarbyl alkoxy silanes may be present in an amount sufficient to improve the adhesion of a coating or an adhesive to a substrate. The epoxyhydrocarbyl alkoxy silanes may be present in the primer composition in an amount of about 0.1 percent by weight or greater based on the weight of the composition; about 0.15 percent by weight or greater or about 0.3 percent by weight or greater. The epoxyhydrocarbyl alkoxy silanes may be present in the primer composition in an amount of about 10 percent by weight or less based on the weight of the composition; about 3.0 percent by weight or less or about 1.0 percent by weight or less.

In the formulas provided hereinbefore the variables may be as described hereinafter. $R^1$ is separately in each occurrence a $C_{1-20}$ hydrocarbylene group. $R^2$ is separately in each occurrence hydrogen or a $C_{1-20}$ hydrocarbyl group. $R^3$ may be separately in each occurrence a $C_{1-4}$ alkyl group. $R^4$ is separately in each occurrence a $C_{1-4}$ alkyl group. $R^5$ is separately in each occurrence a $C_{2-20}$ alkenyl group; $C_{2-10}$ alkenyl, $C_{2-4}$ alkenyl; wherein the double bond may be internal or on the terminal carbon atoms; the double bond may be on the terminal carbon atoms. a is separately in each occurrence 1 or 2. b is separately in each occurrence 1 or 2; with the proviso that a+b=3. w is separately in each occurrence 0 or 1. x is separately in each occurrence an integer of from 1 to 4. y is separately in each occurrence an integer of from 1 to 3. z is separately in each occurrence an integer of from 0 to 2, provided that z=3−y. $R^1$ may be a $C_{1-4}$ alkylene group, a propylene or ethylene group or a propylene group. $R^2$ may be hydrogen or a $C_{1-20}$ alkyl, cyclohexyl or phenyl group; hydrogen or a $C_{1-4}$ alkyl group, or methyl or ethyl groups. $R^3$ may be ethyl or methyl or may be methyl. $R^4$ may be ethyl or methyl or may be methyl. x may be 2 or 3 or may be 3. y may be 2 or 3 or may be 3. z may be 0.

The compositions disclosed may be prepared as a concentrate with less water than desired for use to allow for efficient transportation. The concentrate may be stable for about 3 years or greater. Before use the concentrate may be contacted with a sufficient amount of water to prepare a composition with the desired concentration of components. The water may be contacted with the concentrate with some form of agitation or stirring.

The primer composition may include an alkanol which enhances volatilization of the liquid components after application to the surface of a substrate. Any alkanol that enhances volatilization of the liquid components after application to the surface of a substrate may be used. Exemplary alkanols include $C_{1-4}$ alkanols, such as methanol, ethanol, propanol (straight or branched) or butanol (straight or branched). The compositions may contain ethanol or a propanol. The composition may contain isopropanol. The alkanol may be present in the primer composition in an amount of about 10 percent by weight or greater based on the weight of the composition; about 20 percent by weight or greater or about 25 percent by weight or greater. The alkanol may be present in a the primer composition in an amount of about 45 percent by weight or less based on the weight of the composition; about 40 percent by weight or less or about 35 percent by weight or less.

The composition may include one or more nonionic surfactants to enhance the solubility of the solid components in water or a water alkanol mixture. Any nonionic surfactant that enhances the solubility of the solid components in water or a water alkanol mixture may be utilized in the primer composition. The expression "non-ionic surfactants" as used herein refers to a surfactant which does not dissociate. The molecules are uncharged. The hydrophilic group of non-ionic surfactants may be a polymerized alkylene oxide, such as ethylene oxide and/or propylene oxide (a water soluble polyether with 10 to 100 units length typically). Non-ionic surfactants include alcohol ethoxylates, alkylphenol ethoxylates, phenol ethoxylates, amide ethoxylates, glyceride ethoxylates (soya bean oil and castor oil ethoxylates), fatty acid ethoxylates, and fatty amine ethoxylates. Other significant non-ionic surfactants are the alkyl glycosides in which the hydrophilic groups are sugars (polysaccharides). Exemplary non-ionic surfactants include polyoxyethylene sorbitan surfactants, alkoxylated, principally ethoxylated and/or propoxylated surfactants, wherein a degree of ethoxylation of 5 to 15. The non-ionic surfactant may be present in the primer composition in an amount of about 0 percent by weight or greater based on the weight of the composition; about 0.01 percent by weight or greater or about 0.02 percent by weight or greater. The non-ionic surfactant may be present in a the primer composition in an amount of about 1 percent by weight or less based on the weight of the composition; about 0.5 percent by weight or less or about 0.2 percent by weight or less. The non-ionic surfactant may be present in a concentrate in an amount of about 0 percent by weight or greater based on the weight of the composition; about 0.01 percent by weight or greater or about 0.1 percent by weight or greater. The non-ionic surfactant may be present in a concentrate in an amount of about 1.0 percent by weight or less based on the weight of the composition; about 0.6 percent by weight or less or about 0.4 percent by weight or less.

The composition may include a component that fluoresces when illuminated by ultraviolet light. Fluorescing components are readily available from numerous sources, for example Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the composition must be sufficient so that the area of the window treated with the composition is apparent when the window is illuminated with an ultraviolet light. Alternatively the composition may contain a dye to allow the users of the primer to see where the composition is deposited. Exemplary dyes include Black Shield™ dispersions from Emerald Performance Materials.

The composition may include a stabilizing amount of an organophosphite. The organophosphite may be present in a sufficient amount to enhance the durability of bond of the adhesive composition to the substrate surface. At least one of the phosphorous atoms may be bonded to an oxygen atom which is bonded to an aromatic moiety, such as a phenyl. At least one of the phosphorous atoms may be bonded to an oxygen atom bonded to an alkyl moiety. At least one of the phosphorous atoms is bonded to both an aromatic moiety and an alkyl moiety through oxygen moieties. The organophosphites may be phosphites wherein the ligands on the phosphite comprise one ligand with at least one aliphatic moiety and one ligand with at least one aromatic moiety or comprises at least one ligand having both aromatic and aliphatic structure; i.e. alkaryl. Ligand as used in this context refers to the groups bound to the oxygens bound to the phosphorous atoms of the phosphite. Exemplary organophosphites are poly(dipropyleneglycol) phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). The organophosphite may be present in the composition in an amount of about 0.1 parts by weight or greater or about 0.2 parts by weight or greater based on the weight of the composition. The organophosphite may be present in the composition in an amount of about 1.0 parts by weight or less or about 0.5 parts by weight or less based on the weight of the composition.

The composition may include a light stabilizer. Any light stabilizer which facilitates the system maintaining durable bond to the substrate for a significant portion of the life of the structure to which it is bonded may be used. Preferred light stabilizers are hindered amine light stabilizers. Hindered amine light stabilizers generally comprise include those available from Ciba Geigy such as Tinuvin 144, n-butyl-(3,5-di-ter-butyl-4-hydroxybenzyl)bis-(1,2,2,6-penta methyl-4-piperidinyl) malonate; Tinuvin 622, dimethyl succinate polymer with 4-hydroxy-2,2,6,6-tetramethyl-1-piperidine ethanol; Tinuvin 77, bis(2,2,6,6-tetramethyl-4-piperidinyl) sebacate; Tinuvin 123, bis-(1-octyloxy-2,2,6,6, tetramethyl-4-piperidinyl) sebacate, Tinuvin 765, bis(1,2,2,6,6-pentamethyl-4-piperidinyl) sebacate; Chimassorb 944 poly[[6-[1,1,3,3-tetramethyl-butyl) amino]-1,3,5-triazine-2,4-diyl] [(2,2,6,6-tetramethyl-4-piperidinyl)imino]-1,6-hexanediyl[(2,2,6-tetramethyl-4-piperidinyl)imino]]) and available from Cytec Cyasorb UV-500 1,5-dioxaspiro (5,5) undecane 3,3-dicarboxylic acid, bis(2,2,6,6-tetramethyl-4-piperidinyl) ester; Cyasorb UV-3581, 3-dodecyl-1-(2,2,6,6-tetramethyl-4-piperidyl-pyrrolidin-2,5-dione) and Cyasorb UV-3346, poly[(6-morpholino-s-triazine-2,4-diyl) [2,2,6,6-tetramethyl-4-piperidyl)imino]-hexamethylene [(2,2,6,6-tetramethyl-4-piperidyl) imino]]. More preferred hindered light amine stabilizers include Tinuvin 1,2,3 bis-(1-octyloxy-2,2,6,6, tetramethyl-4-piperidinyl) sebacate and Tinuvin 765, bis(1, 2,2,6,6-pentamethyl-4-piperidinyl) sebacate. A sufficient amount of light stabilizer to enhance the bond durability to the substrate may be used. The light stabilizer may be used in amount of about 0.1 parts by weight or greater, based on the weight of the composition, about 0.2 parts by weight or greater or about 0.3 parts by weight or greater based on the weight of the composition. The amount of light stabilizer present may be about 3 weight parts or less, based on the weight of the composition, about 2 weight parts or less or about 1 weight parts or less.

The composition may include an ultraviolet light absorber. Any ultraviolet absorber which enhances the durability of the bond of the adhesive to the substrate may be used. Exemplary classes of UV light absorbers include benzophenones and benzotriazoles. Exemplary UV light absorbers include those from Ciba Geigy such as Tinuvin P, 2-(2'-hydroxy-5'-methylphenyl)-benzotriazole; Tinuvin 326, 2-(5-chloro-2H-benzotriazol-2-yl)-6-(1,1-dimethylethyl)-4-methylphenol; Tinuvin 213 poly(oxy-1,2-ethanediyl), ($\alpha$,(3-(3-(2H-benzotriazol-2-yl)-5-(1,1-dimethylethyl)-4-hydroxyphenyl)-1-oxopropyl)-$\omega$-hydroxy; poly(oxy-1,2-ethanediyl), ($\alpha$,(3-(3-(AH-benzotriazol-2-yl)-5-(1,1-dimethylethyl)-4-hydroxyphenyl)-1-oxopropyl)-$\omega$-($\alpha$,(3-(3-(2H-benzotriazol-2-yl)-5-(1,1-dimethylethyl)-4-hydroxyphenyl)-1-oxo-propyl); Tinuvin 327, 2-(3,5-di-tertbutyl-2-hydroxyphenol)-5-chlorobenzotriazole; Tinuvin 571, 2-(2H-benzotriazol-2-yl)-6-dodecyl-4-methylphenol, branched and linear; Tinuvin 328, 2-(2H-benzotriazol-2-yl)-4,6-bis(1,1-dimethylpropyl)phenol and from Cytec such as Cyasorb UV-9,2-hydroxy-4-methoxybenzophenone; Cyasorb UV-24, 2,2'-dihydroxy-4-methoxy benzophenone; Cyasorb UV-1164, -[4,6-bis(2,4-dimethylphenyl)-1,3,5-triazin-2-yl]-5-(octyloxy) phenol; Cyasorb UV-2337, 2-(2'-hydroxy-3'-5'-di-t-amylphenyl) benzo triazole; Cyasorb UV-2908, 3,5-di-t-butyl-4-hydroxybenzoic acid, hexadecyl ester; Cyasorb UV-5337, 2-(2'-hydroxy-3',5'-di-t-butylphenyl)-5-chlorobenzotriazole; Cyasorb UV-531, 2-hydroxy-4-n-octoxybenzophenone; and Cyasorb UV-3638, 2,2-(1,4-phenylene)bis[4H-3,1-benzoxazin-4-one]. More preferred UV light absorbers include Cyasorb UV-531 2-hydroxy-4-n-octoxybenzophenone and Tinuvin 571 2-(2H-benzotriazol-2-yl)-6-dodecyl-4-methylphenol, branched and linear. The UV light absorber may be used in sufficient amount to enhance the durability of the bond of the adhesive to the substrate. The UV absorber may be used in an amount of about 0.1 parts by weight or greater, based on the weight of the composition, about 0.2 weight parts or greater or about 0.3 weight parts or greater. The UV light inhibitor is used in amount of about 3 parts by weight or less based on the weight of the composition, about 2 weight parts or less or about 1 parts by weight or less based.

The components of the composition are blended in water under conditions such that a stable homogeneous composition is formed. The composition may be prepared to have concentrations of components for final application as described hereinbefore. Stable as used herein with respect to the composition means that the components remain in solution for a period of three months or greater when stored at ambient temperatures, from 20 to 30° C., for a period of 6 months or greater, for a period of about 3 years or greater or up to 3.5 years. This is also known in the art as the shelf life of the composition.

Disclosed is a kit which comprises the primer composition described hereinbefore and an adhesive or coating comprising a prepolymer containing isocyanate functional groups, silane (alkoxy silyl) groups or a mixture thereof. The adhesive can be any known adhesive useful in bonding substrates together such as windows into structures. The coating can be any coating that protects or improves the appearance of a substrate. The adhesive or coating may contain a prepolymer containing iso cyanate functional groups and the prepolymer may further contain silane functional groups or the adhesive or coating may further contains a silane functional group containing compound. The system disclosed can utilize any isocyanate functional adhesive which is designed for bonding to non-porous surfaces such as metal, coated plastic and/or glass. Examples of useful adhesive systems are disclosed in U.S. Pat. Nos. 4,374,237, 4,687,533, 4,780,520, 5,063,269, 5,623,044, 5,603,798, 5,852,137, 5,976,305, 5,852,137, 6,512,033, relevant portions incorporated herein by reference. Examples of commercial adhesives which may be used herein are BETASEAL™ 15630, 15625, 16605, 1910, 1925, 1948, 1900 adhesives available from The Dow Chemical Company. EFBOND™ windshield adhesives available from Eftec, WS 151™, WS™212 adhesives available from Yokohama Rubber Company, and SIKAFLEX™ adhesives available from Sika Corporation.

The polyisocyanate functional adhesives may comprise a prepolymer having isocyanate functionality, a catalyst for the cure of the prepolymer and other additives well known to those skilled in the art. The prepolymers may be conventional prepolymers used in isocyanate functional adhesive compositions. The prepolymers may be blended with a compound or polymer having silane (siloxy) functionality. The prepolymer may contain silane functionality as well as isocyanate functionality. A prepolymer having silane functionality may be used as the entire prepolymer or it may be blended with a prepolymer which does not have silane functionality. The isocyanate functional prepolymer may be present in sufficient amount such that the adhesive is capable of bonding a first substrate, such as glass or coated plastic, to the desired second substrate such as metal, plastic, fiberglass or composites. The isocyanate functional prepolymer may be present in an amount of about 20 parts by weight or greater based on the weight of the adhesive composition, about 30 parts by weight or greater or about 40 parts by weight or greater. The isocyanate functional prepolymer may be present in an amount of about 99.8 parts by weight or less based on the weight of the adhesive composition, about 98 parts by weight or less or about 85 parts by weight or less.

It is desirable to have a silane present in some form in the adhesive. Exemplary methods of including silane functionality in the adhesive formulations are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The amount of silane present is that amount which enhances the adhesion of the adhesive to the substrate surface. The amount of silane present may be about 0.1 parts by weight or greater based on the weight of the adhesive or about 0.5 parts by weight or greater. The amount of silane used may be about 10 parts by weight or less or about 2.0 parts by weight or less. The adhesive may contain a catalyst which catalyzes the reaction of isocyanate moieties with water or an active hydrogen containing compound known to the skilled artisan. Exemplary catalysts are organotin compounds, metal alkanoates, and tertiary amines, such as dimorpholinodialkyl ethers. The organotin catalyst may be present in an amount of about 1.0 part by weight or less based on the weight of the adhesive, about 0.5 parts by weight or less or about 0.1 parts by weight or less. Tertiary amines may be employed in an amount, based on the weight of the adhesive, of about 0.01 parts by weight or greater based on the adhesive, about 0.05 parts by weight or greater, about 0.1 parts by weight or greater or about 0.2 parts by weight or greater and about 2.0 parts by weight or less, about 1.75 parts by weight or less, about 1.0 parts by weight or less or about 0.4 parts by weight or less. The adhesive composition may further comprise a stabilizing amount of an organophosphite as described hereinbefore.

The adhesive composition may contain a polymer having a flexible backbone and having silane moieties capable of silanol condensation. Among exemplary polymer backbones are polyethers, polyurethanes, polyolefins and the like; polyethers and polyurethanes; or polyethers. Examples of such adhesive compositions are disclosed in Mandi, U.S. 2002/0100550 A1. The polymer may be a polyether having silane (alkoxy silyl) moieties capable of silanol condensation. Useful polymers are disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; or Suzuki et al., U.S. Pat. No. 5,650,467, all incorporated herein by reference. The polymers may be oxyalkylene polymers containing at least one reactive silicon group per molecule. The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. The hydrolyzable group is not particularly limited and is selected from conventional hydrolyzable groups. The flexible polymer used in the adhesive composition may be a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, the contacting may be performed without addition of catalyst. The polymer may be a polyurethane based backbone having hydrolyzable silane groups. Such materials are disclosed in Chang, U.S. Pat. No. 4,622,369 and Pohl, U.S. Pat. No. 4,645,816, relevant portions incorporated herein by reference. The backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakubo, U.S. Pat. No. 4,788,254, column 12, lines 38 to 61; U.S. Pat. Nos. 3,971,751; 5,223,597; 4,923,927; 5,409,995 and 5,567,833, incorporated herein by reference. The polymer prepared can be crosslinked in the presence of a hydrosilylation crosslinking agent and hydrosilylation catalyst as described in U.S. Pat. No. 5,567, 833 at column 17, lines 31 to 57, and U.S. Pat. No. 5,409,995, incorporated herein by reference. The prepolymer is present in the adhesive composition in a sufficient amount such that the adhesive is capable of bonding glass or coated plastic to another substrate, such as metal, plastic, a composite or fiberglass. The prepolymer may be present in an amount of about 30 percent by weight or greater based on the weight of the adhesive, about 40 percent by weight or greater, about 45 percent by weight or greater or about 50 percent by weight or greater. The prepolymer may be present in an amount of about 99.8 percent by weight or less based on the weight of the adhesive or about 85 percent by weight or less. The adhesive composition containing siloxy (silane) functional groups further comprises one or more catalysts known to one skilled in the art which catalyzes the silanol condensation reaction. Exemplary catalysts are tin catalysts which are well known in the art, see U.S. 2002/0100550, paragraph [0042] incorporated herein by reference. The amount of catalyst in the adhesive formulation may be about 0.01 parts by weight or greater, about 0.1 parts by weight or greater, about 0.2 parts by weight or greater, about 5 parts by weight or less, about 1.0 parts by weight or less, 0.5 parts by weight or less or about 0.4 parts by weight or less based on 100 parts by weight of the composition. The silane containing adhesive may further comprise additives known to one skilled in the art including those described hereinbefore with respect to isocyanate prepolymer based adhesive compositions.

Disclosed is a process comprising: a) applying a primer composition disclosed to a surface of a substrate; and b) wiping the applied primer composition off of the surface of the substrate or allowing a major portion of the water in the composition to evaporate off of the surface of the substrate. The composition may be applied by any means well known in the art. It may be applied manually by spraying, brushing, rolling or applying an absorbent material, such as a cloth, containing the composition to the surface of a substrate to which the adhesive will be applied such that a sufficient amount of the composition is applied to the surface. The composition can be applied by hand using an absorbent material such as a felt or sponge applicator, a primer stick or by robotic application, utilizing machines such as automated felt applicator as, e.g., provided by Nordson Deutschland GmbH, Erkrath, Germany or automated spray application equipment as e.g., provided by SCA Schucker GmbH, Bretten-Gölshausen, Germany or the M710I robotic system available from Fanuc Robotics America, of Rochester Hills, Mich. used with an automated primer dispense applicator supplied by Nordson Corporation, Amherst, Ohio. The primer composition may be applied and the water and/or alkanol are allowed to evaporate away from the surface of the substrate. An absorbent material, such as described hereinbefore, may be wiped over the substrate to which the composition was applied. This results in removal of the water and leaves some of the other components on the surface of the substrate. The process may further comprise contacting a first substrate with an adhesive containing a prepolymer having isocyanate, silane or both functional groups and a second substrate wherein the adhesive is applied to the portion of the surface of the first substrate to which the composition was applied and the adhesive is disposed between the first and the second substrates. Where water and/or alkanol are allowed to evaporate away, the adhesive can be applied after sufficient time such that the adhesive durably bonds to the surface of the substrate. Alternatively the applied composition may be subjected to curing conditions to form a coating on the substrate, exposure to curing temperatures, catalyst for curing and/curing agents. The flash time, that is the time the water and/or alkanol are allowed to evaporate away, may be at least about 60 seconds, at least about 20 seconds, or at least about 10 seconds. The primer composition may enhance adhesion after application and before adhesive application for 7 days or more, more preferably 30 days or more, or 90 days or more.

The system disclosed is used to bond porous and nonporous substrates together. The adhesive is applied to a substrate and the adhesive on the first substrate is thereafter contacted with a second substrate. One substrate may be glass the other substrate may be a plastic, metal, fiberglass or composite substrate (for instance cured sheet molding compound) which may optionally be painted. Thereafter the adhesive is exposed to curing conditions. The system may be used to bond glass or plastic coated with an abrasion resistant coating, to other substrates such as metal or plastics. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. The coating may have an ultraviolet pigmented light blocking additive. The glass or plastic window may have an opaque coating disposed in the region to be contacted with the adhesive to block UV light from reaching the adhesive. The glass or plastic window may have a ceramic enamel or organic frit disposed on a portion of the surface of the glass. The glass or plastic can be flat or shaped. Included in shaped glass or plastic is glass or plastic having a curved surface The glass or plastic may be used as a window and the ceramic enamel or organic frit is located about the periphery of the glass or plastic such that it is capable of blocking transmission of light to prevent it from contacting the adhesive. The frit on the periphery also hides the trim components disposed about the periphery of the window. The glass or plastic may be used as a window and may be used as a window in an automobile. The second substrate may be a window frame or a flange of a vehicle adapted to hold a window in place.

The method of bonding glass or plastic, such as a window, to a substrate may comprise, applying an adhesive to the surface of the glass or plastic along the portion of the glass which has the primer composition thereon and which is to be bonded to the structure. Where a ceramic enamel or organic frit is present the adhesive is applied to the surface of the primed frit. The adhesive is thereafter contacted with the second substrate such that the adhesive is disposed between the window and the second substrate. The adhesive is allowed to cure to form a durable bond between the window and the substrate. The adhesives may be applied at ambient temperature in the presence of atmospheric moisture. Exposure to atmospheric moisture is sufficient to result in curing of the adhesive. Curing may be further accelerated by applying heat to the curing adhesive by means of convection heat or microwave heating. The adhesive may be applied as a bead having an engineered cross-sectional shape. Where one of the substrates is to be used as a window the bead is applied around the periphery of the substrate in a manner such that the beginning of the adhesive bead is knitted, contacted with, the end of the bead. The adhesive bead when cured functions to seal around the periphery of the substrate, such as a window.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Parts by weight as used herein refers to compositions containing 100 parts by weight. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Specific Embodiments of Invention

The following examples are included for illustrative purposes only and are not intended to limit the scope of the invention. Unless otherwise stated, all parts and percentages are by weight.

Ingredients 1 to 1 molar condensate of vinyltriethoxysilane and aminopropyltriethoxysilane 16 percent by weight of active condensate in water/alkanol and minor amounts of nonionic surfactants <2 percent by weight
3-mercaptopropyltrimethoxysilane
3-glycidoxypropyltrimethoxysilane
Deionized water Primer Preparation An 8 ounce glass bottle, without cap, is dried in an oven at 110° C. for at least 30 minutes. The bottle is cooled in a nitrogen atmosphere. Deionized water is added to the bottle followed by the condensate of vinyltriethoxysilane and aminopropyltriethoxy-silane, 3-mercaptopropyltrimethoxysilane and, if present, 3-glycidoxypropyltrimethoxy silane. The cap is place on the bottle and it is shaken for 1 minute using a paint shaker, Model 5410, by Red Devil Equipment Co.

Storage Stability

Samples of the formulations are prepared and stored under the following conditions for at least 3.5 years. At selected intervals the samples are inspected for appearance. The results are compiled in Table 1.

Quick Knife Adhesion Test:

Quick knife adhesion (QKA) test is run according to the following. An adhesive bead of 6.3 mm (width)×6.3 mm (height)×100 mm (length) is placed on the tested substrate and the assembly is cured for a specific time at 23° C. and 50 percent RH (relative humidity). When tested, a slit (20-40 mm) is made between the adhesive end and the substrate. The cured bead is then cut with a razor blade at a 45° angle while pulling back the end of the bead at 180° angle to the substrate. The degree of adhesion is evaluated as adhesive failure (AF) and/or cohesive failure (CF). In case of AF, the cured bead can be separated from the substrate and in case of CF, separation occurs only within the adhesive bead as a result of knife cutting.

Lap Shear Testing

The lap shear test is performed according to SAE J1529 procedure which is described below. A triangle bead of adhesive composition approximately 6.3 mm base and 8 mm height is applied along the width of a first substrate of 25 mm by 100 mm, and about 6 mm away from the coupon end. The second substrate is immediately pressed on the adhesive bead to give a final height of 6 mm for the composition in between. The sample is allowed to cure under specific conditions as described herein. The sample is then pulled right away at a rate of 5 inch/minute (127 mm/min) with an Instron Tester. The load (lbs) at sample break divided by the sample area (in2) to give the lap shear adhesion strength (psi). The cohesive failure refers to the percent of separation within the adhesive bead.

Examples 1-6 and Comparative Examples 1-3

Preparation and Testing

Samples are tested as the glass primer along with the Betaseal™ 16030 urethane adhesive. Three types of glasses are used in the adhesion study: press bent (Bismuth frit) (Substrate 1); sag bent (Bismuth frit) (Substrate 2) and plain glass (Substrate 3). These glass coupons are first primed with the solutions described in Table 1 using wipe on and wipe off method. After 2 minutes open time, Betaseal 16030 urethane adhesive is applied onto these primed coupons. Open time is the time from wiping off the solution to application of the adhesive. The adhesion is checked after following conditions: condition 1). 3 day initial cure under CT conditions (23° C./50% relative humidity); condition 1a). 7 day initial cure under CT conditions (23° C./50% relative humidity); condition 2). 7 day CT cure and then 14 days under 100° F. (38° C.)/100% relative humidity conditions; condition 3). 7 day initial CT cure and then 10 days 60° C. water soaking conditions. The results are compiled in the Table 1 with 100CF being 100% desirable cohesive failure and 100AF being complete undesirable adhesive failure. Formulations tested. The formulations tested are described in Table 1. Examples 4 and 5 are tested with a number of different open times. The results are compiled in Table 3.

Examples 7-9 Testing

In Examples 7 to 9 three formulations with varying amounts of the condensate of vinyltriethoxysilane and aminopropyltriethoxysilane are tested in the same manner as Examples 1 to 6 are tested. The formulations and results are compiled in Table 3.

Example 10

In Example 10 a primer as disclosed herein is prepared and applied to a glass lap shear coupon of substrate 1. The primer is applied using felt and the water is allowed to flash off for 10 minutes. A number of samples are prepared by applying polyurethane based glass bonding adhesives to the glass substrate and an e-coated steel coupon, which is primerless, is applied in an overlapping manner over the glass coupon with adhesive is applied. Cure condition 4 is 1000 hours aging in a Weatherometer according to SAE J1885 conditions after initial 7 day cure under 23° C./50% relative humidity. The Example 10 formulation is shown in Table 4. The results are compiled in Table 5.

TABLE 1

| | Example | | | | | | | | |
|---|---|---|---|---|---|---|---|---|---|
| | C-1 | C-2 | C-3 | 1 | 2 | 3 | 4 | 5 | 6 |
| Component | | | | | | | | | |
| DI Water | 85.0 | 84.85 | 84.70 | 84.85 | 84.70 | 84.70 | 84.55 | 84.55 | 84.40 |
| vinylsilane-aminosilane condensate (active) | 15.00 (2.4) | 15.00 (2.4) | 15.00 (2.4) | 15.00 (2.4) | 15.00 (2.4) | 15.00 (2.4) | 15.00 (2.4) | 15.00 (2.4) | 15.00 (2.4) |
| Mercapto silane | 0 | 0 | 0 | 0.15 | 0.30 | 0.15 | 0.30 | 0.15 | 0.30 |
| Epoxy silane | 0 | 0.15 | 0.30 | 0 | 0 | 0.15 | 0.15 | 0.30 | 0.30 |
| Stability 3 Months | Clear | Clear | Clear | Light Yellow | Light Yellow | Light Yellow | Dark Yellow | Light Yellow | Dark Yellow |
| Stability 5 Months | Slightly Cloudy | Clear | Clear | Light Yellow | Light Yellow | Light Yellow | Dark Yellow | Light Yellow | Dark Yellow |
| Stability 1 year | White Cloudy Gelling | Cloudy | Cloudy | Light Yellow Clear | Yellow Clear | Light Yellow Clear | Light Yellow Clear | Light Yellow Clear | Dark Yellow Clear |
| Stability 3.5 years | Gel white | Gel white | Gel white | Yellow solution | Yellow solution | Yellow solution | Yellow solution | Yellow solution | Yellow solution |
| Quick Knife Adhesion | | | | | | | | | |
| Substrate 1 Cond 1 | 100CF | 100CF | 100CF | 100CF | 100CF | 100CF | 100CF | 100CF | 100CF |
| Substrate 1 Cond 2 | 100CF | 100CF | 100CF | 100CF | 100CF | 100CF | 100CF | 100CF | 100CF |
| Substrate 1 Cond 3 | 100CF | 100CF | 100CF | 100CF | 100CF | 100CF | 100CF | 100CF | 100CF |
| Substrate 2 Cond 1 | 100CF | 100CF | 100CF | 100CF | 100CF | 100CF | 100CF | 100CF | 100CF |
| Substrate 2 Cond 2 | 60AF | 80AF | 95AF | 100CF | 100CF | 100CF | 100CF | 100CF | 100CF |
| Substrate 2 Cond 3 | 10CF | 10AF | 90AF | 100CF | 100CF | 100CF | 100CF | 100CF | 100CF |

TABLE 1-continued

| | Example | | | | | | | | |
|---|---|---|---|---|---|---|---|---|---|
| | C-1 | C-2 | C-3 | 1 | 2 | 3 | 4 | 5 | 6 |
| Substrate 3 Cond 1 | 100CF | 100CF | 100CF | 100CF | 100CF | 100CF | 100CF | 100CF | 100CF |
| Substrate 3 Cond 2 | 10AF | 90AF | 85AF | 100CF | 100CF | 100CF | 100CF | 100CF | 100CF |
| Substrate 3 Cond 3 | 100CF | 90AF | 90AF | 100CF | 100CF | 100CF | 100CF | 100CF | 100CF |

The total amount of components is 100.

The stability results are reported as the observed appearance

In the Quick Knife Adhesion results where AF percentage is stated the CF percentage is the remainer (100-AF)

TABLE 2

| Open Time days | Substrate | Cure Condition | Example 4 | Example 5 |
|---|---|---|---|---|
| 7 | 1 | 1 | 100CF | 100CF |
| 7 | 1 | 2 | 100CF | 100CF |
| 7 | 2 | 1 | 100CF | 100CF |
| 7 | 2 | 2 | 100CF | 100CF |
| 7 | 3 | 1 | 100CF | 100CF |
| 7 | 3 | 2 | 100CF | 100CF |
| 60 | 1 | 1 | 100CF | 100CF |
| 60 | 1 | 2 | 100CF | 100CF |
| 60 | 2 | 1 | 100CF | 100CF |
| 60 | 2 | 2 | 100CF | 100CF |
| 60 | 3 | 1 | 100CF | 100CF |
| 60 | 3 | 2 | 100CF | 100CF |
| 90 | 1 | 1 | 100CF | 100CF |
| 90 | 1 | 2 | 100CF | 100CF |
| 90 | 2 | 1 | 100CF | 100CF |
| 90 | 2 | 2 | 100CF | 100CF |
| 90 | 3 | 1 | 100CF | 100CF |
| 90 | 3 | 2 | 100CF | 100CF |

TABLE 3

| | Example | | |
|---|---|---|---|
| | 7 | 8 | 9 |
| Component | | | |
| DI Water | 88.60 | 83.60 | 78.60 |
| condensate of vinyl silane and amino silane (active) | 10.00 (1.6) | 15.00 (2.4) | 20.00 (3.2) |
| Mercapto silane | 1.25 | 1.25 | 1.25 |
| Epoxy silane | 0.15 | 0.15 | 0.15 |
| Stability | | | |
| Appearance 3 mon | Light yellow cloudy | Light yellow clear | yellow clear |
| Appearance 3 yr | Cloudy yellow | Liquid yellow | Liquid yellow |
| Quick Knife Adhesion | | | |
| Substrate 1 Cond 1 2 min open time | 100 CF | 100 CF | 100 CF |
| Substrate 1 Cond 2 2 min open time | 100 CF | 100 CF | 100 CF |
| Substrate 1 Cond 1 60 day open time | 100 CF | 100 CF | 100 CF |
| Substrate 1 Cond 2 60 day open time | 100 CF | 100 CF | 100 CF |

TABLE 4

| Component | Example Example 10, Percent by weight |
|---|---|
| DI Water | 54.55 |
| Condensate of vinyl silane and amino silane | 30 (4.8) |
| Isopropyl Alcohol | 30 |
| Mercapto silane | 0.30 |
| Epoxy silane | 0.15 |

TABLE 5

| Cure Cond | BS1948US Adhesive psi (MPa) | BETASEAL® ONE Adhesive psi (MPa) | BETASEAL® 15700 Adhesive psi (MPa) | BETASEAL® 16605 Adhesive psi (MPa) |
|---|---|---|---|---|
| 1a | 678 (4.67) | 675 (4.65) | 741 (5.11) 100CF | 653 (4.50) |
| 2 | 651 (4.49) | 596 (4.11) | 724 (4.99 MPa) | 601 (4.14) |
| 4 | 450 (3.10) | 575 (3.96) | 747 (5.15) | 505 (3.48) |

All of the samples in Table 4 showed 100 percent cohesive failure at break.

What is claimed is:

1. A composition comprising:
  a) a condensate of one or more aminohydrocarbyl alkoxy silanes and one or more alkenyl alkoxy silanes;
  b) one or more mercaptohydrocarbyl alkoxy silanes; and,
  c) 20 to 89.9 percent by weight, based on the weight of the composition, of water;
  and one or more alkanols in an amount of about 10 to about 45 percent by weight of the composition, and one or more non-ionic surfactants in an amount of about 0.01 to about 3.0 percent by weight of the composition, wherein the composition is useful as a primer useful with adhesives or coating containing polymers having isocyanate functional groups, alkoxy silane functional groups or both.

2. A composition according to claim 1 comprising
  a) from about 1.5 to about 10 percent by weight of an condensate of one or more aminohydrocarbyl alkoxy silanes and one or more alkenyl alkoxy silanes;
  b) from about 0.1 to about 10 percent by weight one or more mercaptohydrocarbyl alkoxy silanes; and
  c) from about 20 to about 89.9 percent by weight of water; wherein the percent by weight is based on the weight of the composition.

3. The composition according to claim 1 including d) one or more epoxyhydrocarbyl silanes.

4. The composition according to claim 3 wherein the d) one or more epoxyhydrocarbyl silanes are present in an amount of about 0.1 to about 10 percent by weight.

5. The composition according to claim 3 wherein the aminohydrocarbyl alkoxy silanes correspond to formula 1 or 2;

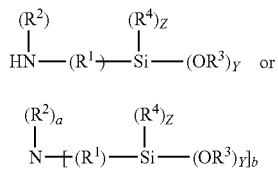

the alkenyl alkoxy silanes correspond to the formula;

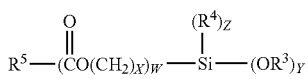

the mercaptohydrocarbyl alkoxy silanes correspond to the formula

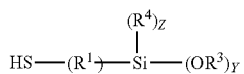

the epoxyhydrocarbyl silanes correspond to the formula

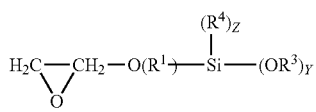

and,
the condensate may be represented by one of the formulas;

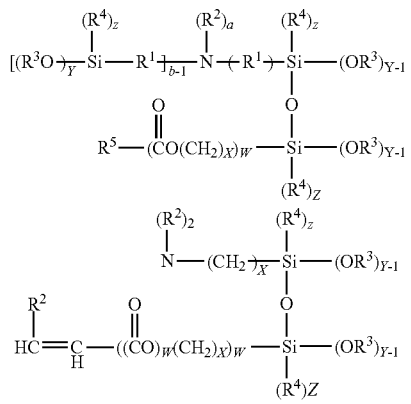

wherein $R^1$ is separately in each occurrence a $C_{1-20}$ hydrocarbylene group;
$R^2$ is separately in each occurrence hydrogen or a $C_{1-20}$ hydrocarbyl group;
$R^3$ is separately in each occurrence a $C_{1-4}$ alkyl group;
$R^4$ is separately in each occurrence a $C_{1-4}$ alkyl group;
$R^5$ is separately in each occurrence a $C_{1-20}$ alkenyl group;
a is separately in each occurrence 1 or 2;
b is separately in each occurrence 1 or 2;
w is separately in each occurrence 0 or 1;
x is separately in each occurrence an integer of from 1 to 4;
y is separately in each occurrence an integer of from 1 to 3; and
z is separately and integer of from 0 to 2 provided that z=3−y;
with the proviso that a+b=3.

6. The composition according to claim 1 wherein the condensate is prepared from about 30 to 70 mole percent of the aminohydrocarbyl alkoxy silanes and from about 30 to 70 mole percent of the alkenyl alkoxy silanes.

7. A kit comprising a composition according to claim 1 and an adhesive comprising a prepolymer containing isocyanate functional groups, silane groups or a mixture thereof.

8. A process comprising steps of:
a) applying a composition according to claim 1 to a surface of a first substrate; and
b) wiping the applied composition off of the surface of the first substrate or allowing a major portion of the water in the composition to evaporate off of the surface of the first substrate.

9. A process according to claim 8 wherein the applied composition is wiped off of the surface of the first substrate.

10. A process according to claim 8 wherein the water, and optionally alkanol, in the applied composition is allowed to evaporate off of the surface of the substrate.

11. A process according to claim 8 wherein the water, and optionally alkanol, is allowed to evaporate off for at least about 10 seconds.

12. A process according to claim 1 wherein the composition is applied by spraying it onto the first surface, by brushing it on the first surface, or by wiping it on the first surface using an absorbent structure.

13. A process according to claim 8 which further comprises a step of contacting the first substrate with an adhesive containing a prepolymer having isocyanate, silane or both functional groups and a second substrate wherein the adhesive is applied to the portion of the surface of the first substrate to which the composition was applied and the adhesive is disposed between the first and the second substrates.

14. A process according to claim 13 wherein a time period between applying the composition to the first surface and contacting the first surface with the adhesive is from about 20 seconds to 90 days.

15. A process according to claim 8 wherein the first substrate is glass or glass having a ceramic or organic frit on the portion of the surface which is bonded to a second substrate.

16. A process according to claim 15 where in the glass substrate is a window and the second substrate is a flange in a vehicle adapted to hold the window in place in the vehicle or the second substrate is a window frame in a building.

* * * * *